(12) United States Patent
Smith

(10) Patent No.: US 8,438,592 B2
(45) Date of Patent: May 7, 2013

(54) DYNAMIC LIVE CONTENT PROMOTER FOR DIGITAL BROADCAST TV

(75) Inventor: Allen W. Smith, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 317 days.

(21) Appl. No.: 12/644,282

(22) Filed: Dec. 22, 2009

(65) Prior Publication Data

US 2011/0154390 A1 Jun. 23, 2011

(51) Int. Cl.
| | |
|---|---|
| H04H 60/33 | (2008.01) |
| H04H 60/32 | (2008.01) |
| H04N 7/10 | (2006.01) |
| H04N 7/025 | (2006.01) |
| H04N 7/16 | (2011.01) |

(52) U.S. Cl.
USPC .......... 725/20; 725/32; 725/33; 725/34; 725/35; 725/36; 725/62; 725/135; 725/136

(58) Field of Classification Search .......... 725/135
See application file for complete search history.

(56) References Cited

U.S. PATENT DOCUMENTS

| | | | | |
|---|---|---|---|---|
| 2002/0059642 A1* | 5/2002 | Russ et al. | | 725/135 |
| 2002/0060701 A1 | 5/2002 | Naughton et al. | | |
| 2002/0166123 A1* | 11/2002 | Schrader et al. | | 725/58 |
| 2003/0115601 A1* | 6/2003 | Palazzo et al. | | 725/42 |
| 2003/0188321 A1 | 10/2003 | Shoff et al. | | |
| 2007/0136749 A1* | 6/2007 | Hawkins et al. | | 725/38 |
| 2007/0273664 A1* | 11/2007 | Kim et al. | | 345/173 |
| 2008/0092203 A1* | 4/2008 | Bouazizi et al. | | 725/135 |
| 2009/0178008 A1* | 7/2009 | Herz et al. | | 715/840 |
| 2009/0282436 A1 | 11/2009 | Perry | | |
| 2010/0082821 A1* | 4/2010 | Rosenblatt et al. | | 709/228 |
| 2010/0257561 A1* | 10/2010 | Maissel et al. | | 725/41 |
| 2010/0333027 A1* | 12/2010 | Martensson et al. | | 715/833 |

FOREIGN PATENT DOCUMENTS

| | | |
|---|---|---|
| WO | WO0219237 A1 | 3/2002 |
| WO | WO03085982 A2 | 10/2003 |

OTHER PUBLICATIONS

International Search Report and Written Opinion—PCT/US2010/061626—ISA/EPO—Feb. 25, 2011.

* cited by examiner

*Primary Examiner* — Justin Shepard
(74) *Attorney, Agent, or Firm* — Fulbright & Jaworski L.L.P.

(57) ABSTRACT

Methods and devices for alerting users to live programming on digital television broadcast receiver devices provide an on-screen object revealing a content item broadcast in an overhead flow portion of a broadcast signal. Information regarding programs available on other channels or content flows may be presented in a portion of the display screen. A variety of user touch gestures may be recognized on a touch-screen-equipped digital television receiver to enable users to respond to promotion messages. Users may use touch gestures to request a next promotion message, request further details regarding a promotion, discontinue promotion displays, and select a promoted program. Digital broadcast television systems may be configured to transmit promotion messages within the overhead flow in response to developments in broadcast content, special messages received from content providers, and the programs currently being broadcast.

44 Claims, 11 Drawing Sheets

US 8,438,592 B2

DYNAMIC LIVE CONTENT PROMOTER FOR DIGITAL BROADCAST TV

BACKGROUND

Wireless communication technologies have seen explosive growth over the past few years. This growth has been fueled by wireless services providing freedom of movement to the mobile public, and cutting the tether to hardwired communication systems. As a result of service enhancements, the popularity of wireless services is expected to continue to grow rapidly. A recent addition to wireless communication services has been the ability to broadcast television and other content to digital television receivers. Mobile television (TV) broadcast services allow users to view TV programming, as well as receive mobile editions of news, entertainment, sports, business, and other programming, using their cell phones or other wireless digital television receivers configured to receive the mobile broadcast transmissions. Thus, there is a need for enhanced user interfaces to enable digital television receiver users to enjoy the full benefits of the mobile broadcast programming available that is expected to become available. Similar needs exist for all digital television receivers.

SUMMARY

Methods and devices for alerting users to live programming on digital television broadcast receiver devices provide an on-screen object revealing a content item broadcast in an overhead flow portion of a broadcast signal. Information regarding programs available on other channels or content flows may be presented in a portion of the display screen. A variety of user touch gestures may be recognized on a touch-screen-equipped digital television receiver device to enable users to respond to promotion messages. Users may use touch gestures to request a next promotion message, request further details regarding a promotion, discontinue promotion displays, and select a promoted program. Digital broadcast television systems may be configured to transmit promotion messages within the overhead flow in response to developments in broadcast content, special messages received from content providers, and the programs currently being broadcast.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
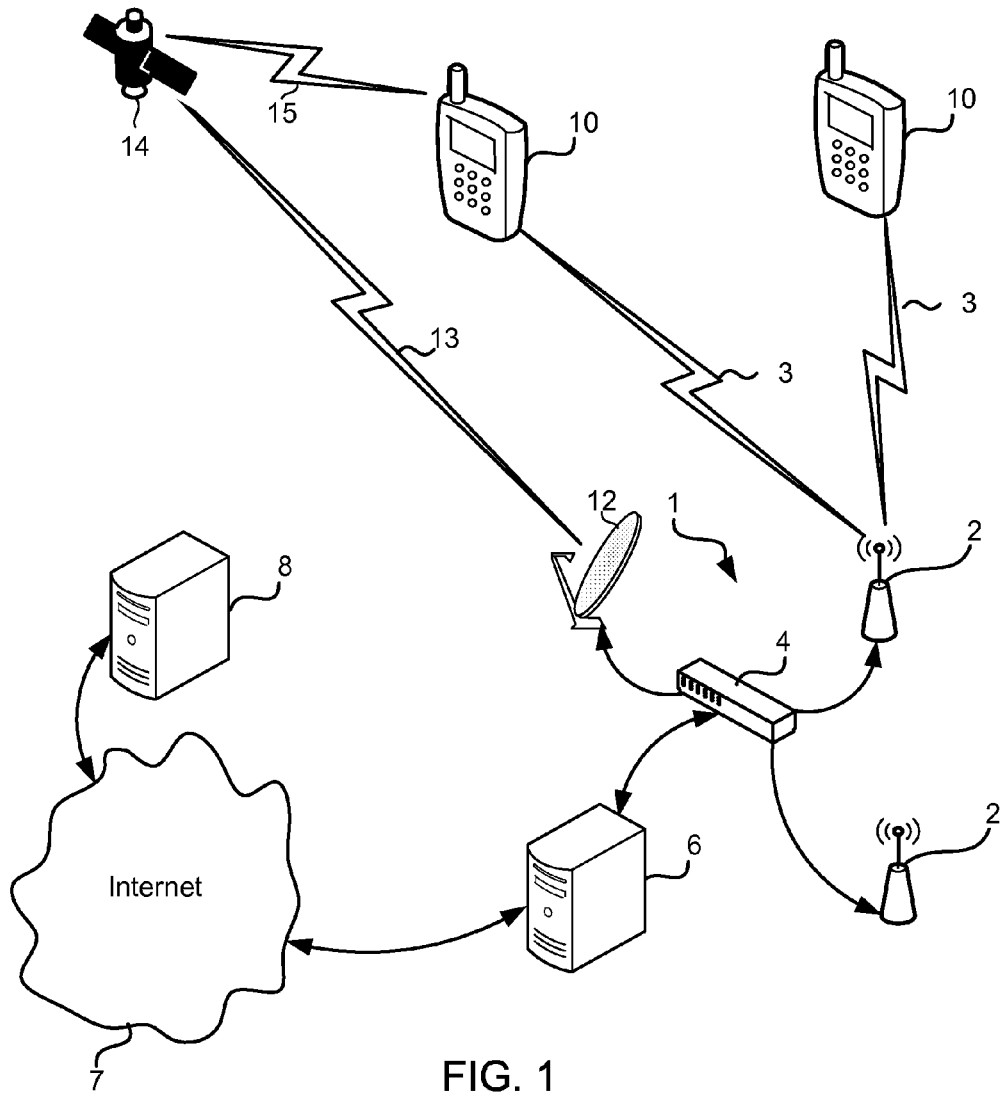
FIG. 1 is a communication system block diagram illustrating a digital multimedia broadcast communication system suitable for use in an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "mobile handsets" and "mobile devices" are used interchangeably and refer to any one of various cellular telephones, personal data assistants (PDAs), palm-top computers, laptop computers, wireless electronic mail receivers (e.g., the Blackberry® and Treo® devices), mobile television receivers, multimedia Internet enabled cellular telephones (e.g., the Blackberry Storm®), and similar personal electronic devices configured to receive digital television services. A mobile device may include a programmable processor and memory, as described more fully below with reference to FIG. 10.

As used herein, the term "digital television receiver" and "digital television receiver device" are used to refer to devices capable of receiving and displaying digital television services. In some applications a digital television receiver may be a digital television receiver, such as when the digital television service received is a mobile television broadcast signal. However, the embodiments and the scope of the claims are not limited to digital television receivers and may encompass all digital television receiver devices.

The word "broadcast" and "digital broadcast" are used herein to mean the transmission of data (e.g., in the form of information packets) so that it can be received by a large number of receiving devices simultaneously. Examples of digital broadcast messages are digital television service broadcast signals, including content broadcasts (content flow) and overhead information broadcasts (overhead flow) such as metadata messages. An example of a digital broadcast suitable for use with the various embodiments is the Media FLO (Forward Link Only) mobile broadcast television services.

The various embodiments operate in conjunction with digital broadcast television services, such as mobile broadcast television services like Media FLO. Similar to analog forms of broadcast television (e.g., NTSC, ATSC, and PAL), a digital television broadcast network may provide multiple channels of multimedia content. At any given time, a channel may contain live content (e.g., sporting events and news reports) or pre-recorded content (e.g., movies and sitcoms). Further, digital broadcast television services have the capability of transmitting content that digital television receivers can download for later display, such as websites, relatively short programs and video clips, news items, and other data, which, since they are stored in digital television receiver memory after downloading, may be viewed at any time. For ease of reference, the term "live content" is used herein to refer to content that a user may be interested in tuning to, and thus appropriate for promotions in accordance with the various embodiments. However, the term "live" is merely exemplary and is not meant to be limiting.

Currently, digital television receivers receiving digital broadcast television services, such as MediaFLO, provide no good way to alert users to live programming available on other channels or content flow. As digital broadcast services suitable for mobile receiver devices (e.g., Media FLO) embrace more live programming, a messaging and tuning system by which a user can easily learn about other programming happening at that moment and tune to it immediately would be valuable.

The various embodiments provide digital television receiver users with an announcement of content available on other channels or content flows along with the ability to quickly select a promoted content. For ease of reference, such an announcement of currently available content on other channels or flow numbers is sometimes referred to herein as a "promotion" or prompt because it may serve to promote other available content; however, the embodiments are not limited to announcements that actually promote another program. The various embodiments may present content promotions in a portion of the display screen and in a manner that does not detract from the user's enjoyment of a currently selected content. The embodiments may be particularly useful on digital television receivers equipped with a touchscreen that can accept a user selection of a content promotion simply by touching it or executing a touch gesture on the touchscreen. In response to a promotion notification, a user may use finger gestures on a touchscreen to immediately select the promoted live content, to view more live content promotions, or dismiss the promotions and subsequent notifications.

Digital TV broadcast services typically broadcast information about the programs and content that will be broadcast in the future within a portion of broadcast transmissions dedicated to carrying such overhead information that is referred to herein as the "overhead flow." This information about the content, which is a form of metadata, enables digital television receivers to discover how and when to receive selected content. Digital television receivers can also process this metadata to provide users with an electronic viewing guide. Such an electronic viewing guide, which is known in some mobile TV formats as an "Electronic Program Guide" (EPG), "media service guide" (MSG), "service guide" or "electronic service guide" (ESG), is a viewable program guide similar to that available on cable and satellite television systems. The electronic viewing guide provided on digital TV broadcast networks enables users to see a listing of programming and content that is available, when, and on what "channel." The electronic viewing guide may be presented in a graphical user interface format. In addition to identifying the start time and broadcast address for particular programs and content, the broadcast metadata may also include information regarding the nature of the content to be broadcast.

The broadcast metadata may be transmitted in the overhead flow, which may be a low data rate portion of the digital TV broadcast signal suitable for carrying overhead information like the program and content metadata. In contrast to the overhead flow, programs and content are broadcast via high data rate portions of the broadcast signal, which are collectively referred to herein as the "content flow."

A number of different digital broadcast television services and broadcast standards are available or contemplated in the future, all of which may implement and benefit from the various embodiments. Such services and standards include: Open Mobile Alliance Mobile Broadcast Services Enabler Suite (OMA BCAST), MediaFLO; Digital Video Broadcast IP Datacasting (DVB-IPDC); Advanced Television Systems Committee (ATSC) broadcast digital television standard ATSC-M/H; and China Multimedia Mobile Broadcasting (CMMB). While the broadcast formats and terminology vary among the different digital TV broadcast service standards, they all employ metadata transmissions to enable digital television receivers to receive selected content and inform users of programs and content available for viewing or download. To avoid confusion regarding particular broadcast standards, the generic terms content flow, overhead flow, and metadata messages are used herein to describe the various embodiments.

Example components of a typical digital television broadcast system are illustrated in FIG. 1. A digital multimedia broadcast network 1 typically includes a plurality of broadcast transmitters 2 controlled by a digital broadcast network control center 4. The digital multimedia broadcast network 1 broadcasts content from the broadcast transmitters 2 as digital broadcast transmissions 3 for reception by digital television receivers 10. Within the digital broadcast network control center 4 will typically be one or more servers 6 which may be configured to manage the scheduling of content broadcasts, generation of electronic service guides and other metadata regarding the content broadcasts, and generation of metadata messages for broadcast via the information flow of the digital multimedia broadcast network 1. One or more servers 6 may also include connections to an external network, such as the Internet 7, through which the server 6 may receive content feeds and other data (e.g., public safety announcements from a governmental emergency services agency) from content provider servers 8. One or more servers 6 may determine a schedule for broadcast of the content in content batches, generate an information flow including metadata regarding the content (e.g., broadcast times and flow numbers), assign a version number to the information flow, and provide the information flow data to the digital multimedia broadcast network 1 for inclusion within the broadcast signal that is transmitted for reception by digital receiver devices 10.

FIG. 1 also illustrates how the embodiments are not limited to terrestrial broadcast systems, and may also apply to other forms of digital television broadcasts, such as satellite television services. Digital broadcast service employing satellites 14 will typically include a ground station 12 coupled to the digital broadcast control center 4 that transmits uplink signals 13 to a satellite 14 in geosynchronous orbit. The broadcast television the satellite 14 receives the uplink signals 13 and broadcasts downlink signals 15 which can be received by suitably equipped digital receiver devices 10.

The information flow included in broadcast signals informs digital receiver devices 10 when each program or content will be transmitted and the broadcast address (e.g., flow or channel number) on which each flow of content may be received. Digital receiver devices 10 can use the information in the information flows to determine if any of the content has been selected by the user for reception or download and, if so, determine the time to tune-in to the broadcast transmissions and the network address on which to receive the selected content.

Figure 2:
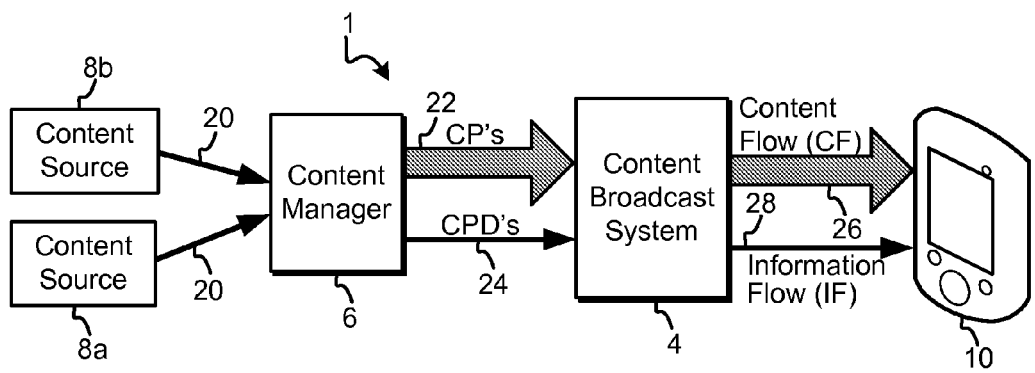
FIG. 2 is an alternative representation of a communication system block diagram of a digital multimedia broadcast system.

FIG. 2 illustrates the generation and transmission of signals within a digital multimedia broadcast network 1. As mentioned above, a digital multimedia broadcast network 1 may receive content (e.g., television programs websites, serial data feeds, live event-based data, etc.) from a number of content sources 8a, 8b. Such content may be provided to a content manager server 6 within a digital multimedia broadcast network 1 via data networks 20 (e.g., the Internet 7). The content manager server 6 may store such content in a database and schedule the content for broadcast. In scheduling content for broadcast, the content manager server 6 determines what will be broadcast when, and on which broadcast stream (e.g., flow or channel number). As part of scheduling, the content manager server 6 may format the content into content packages (CPs), which will be broadcast in one or more content flows 26. The content manager server 6 can also determine information about the content, such as a title of the information, its source (e.g., an Internet address, URL or producer), the nature of the information (e.g., sports, news, finance, etc.), its age or date/time of creation, and other information about the content that may be useful for selecting content matching user preferences.

The content manager server 6 may combine the scheduled broadcast time and address with the other information regarding the content (such as the associated media logical channels for each content flow) to generate content packet descriptions (CPDs) which will be broadcast in one or more information flows 28. When content is scheduled for broadcast, the content manager server 6 may provide the content packages to the content broadcast system 4 in an internal network dataflow 22, along with the content packet descriptions in an internal network dataflow 24. These data flows are then processed by the content broadcast system 4 into a multiplex broadcast waveform which are broadcast live by the network transmitters 2 as broadcast transmissions.

Figure 3:
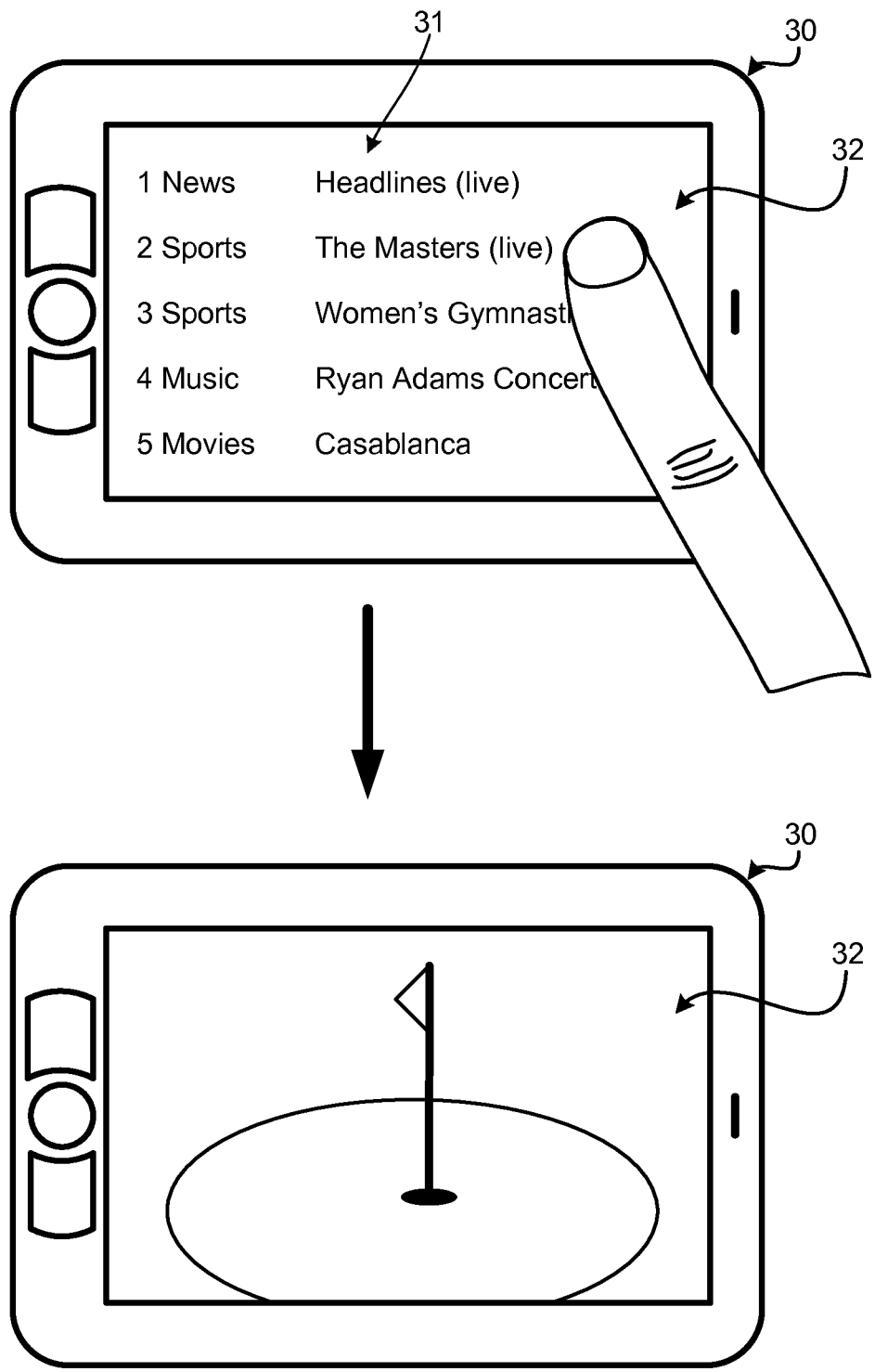
FIGS. 3-7 are illustrations of various embodiment digital broadcast television applications executing on a digital television receiver device.

The various embodiments provide program information displays which can work in conjunction with touchscreen enabled digital television receivers 30, such as an extension of a user interface operating on such devices. An example of a digital television receiver 30 is illustrated in FIG. 3, which shows a digital television receiver application in operation. The illustrated digital television receiver 30 includes a touchscreen 32 capable of displaying a graphical output of the digital television receiver 30, and of recognizing touch events and sending corresponding signals to the processor of the digital television receiver 30. To select a program for viewing from a viewer guide 31, a user may touch the displayed listing of the desired content to prompt the processor to perform tasks necessary to access the channel or flow number associated with the selected content. FIG. 3 illustrates this by showing a golf program displayed on the digital television receiver 30 in response to the user touching the "The Masters (live)" program listing. In a conventional digital television receiver 30, once the user has selected a program for display, the user receives no more information regarding other programs available without reactivating the viewer guide 31.

Figure 4:
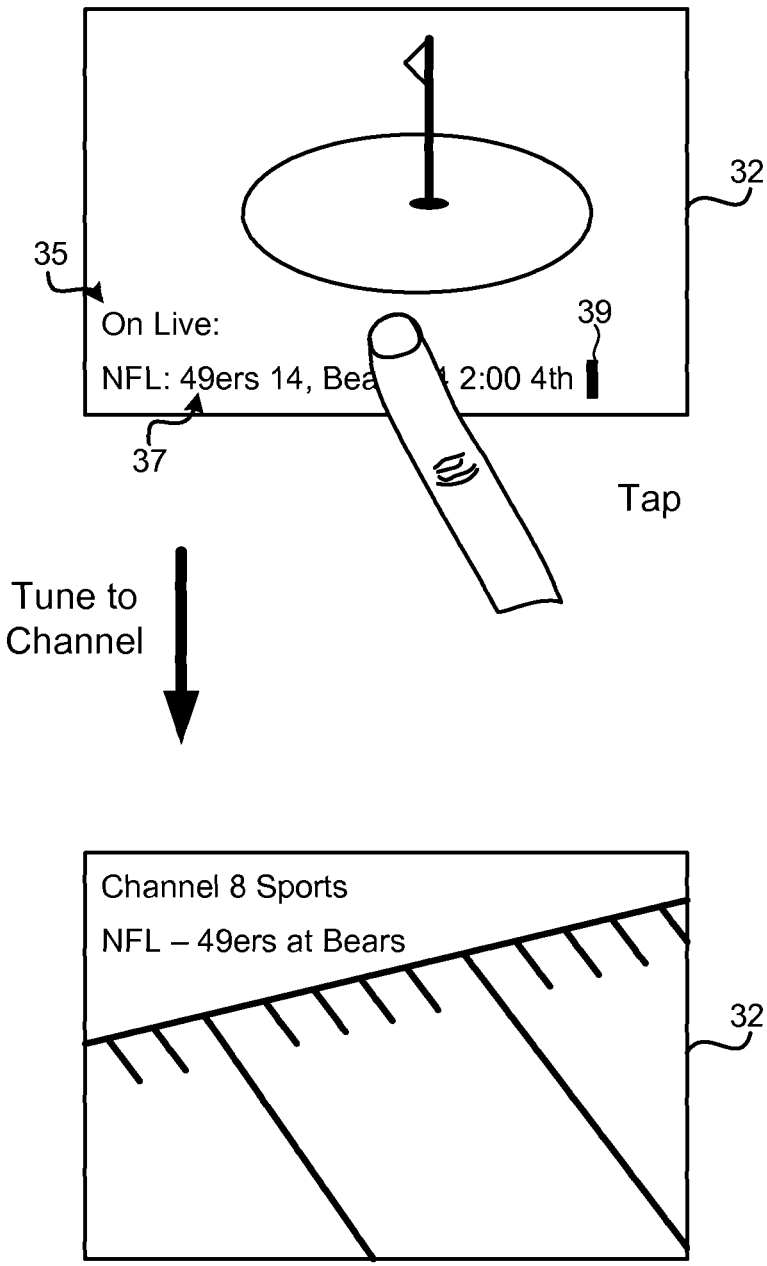

The various embodiments provide on-screen notifications of live content available on other channels while users are viewing a program, an example of which is illustrated in FIG. 4. For example, the digital television receiver application may provide an on-screen notification 35 to inform the user of the live content currently on another channel. The on-screen notification 35 may be formatted in a variety of ways, such as including a header portion and a content promotion string 37, which in an embodiment may be a set of alphanumeric characters displayed in a system font. In some embodiments, the content promotion string 37 may include images or animation, and may be accompanied by audio tones to further alert users of the promotion string. In an embodiment, the content promotion string 37 or the on-screen notification 35 in its entirety may be overlaid across the current content using alpha blending to avoid completely obscuring the current program.

In the various embodiments, the digital television receiver application may tune to the channel associated with the promoted content if the user taps a finger on the on-screen notification 35 (i.e., touching and quickly removing the finger from the surface and not holding down the finger), which is referred to herein as a "tap" gesture. The tap gesture may be configured in a variety of ways. The tap gesture may be detected simply based upon the location of a tap on the touchscreen 32 in the vicinity of the promotion display. In an alternative embodiment or implementation the tap may involve a pressure threshold test. In such a pressure-sensitive tap the user must tap the touchscreen 32 with a force greater than a certain threshold value and/or less than a certain threshold value. In an alternative embodiment or implementation the tap gesture may be recognized when the user's finger touches the screen for more than a minimum time threshold value and/or less than a maximum time threshold value. In an alternative embodiment or implementation the tap gesture may be acknowledged by the digital television receiver 30 implementing some form of haptic or audio feedback mechanism, such as a vibration or click. The haptic or audio feedback may be configured as part of the overall look and feel of the digital television receiver 30 or it may be specific to the digital television receiver application.

Another gesture that may be recognized by a digital television receiver 30 is referred to herein as a "press and hold" gesture. The press and hold gesture may be detected based upon the location and duration of a touch on the touchscreen 32 in the vicinity of the promotion display. To distinguish the press and hold gesture from the tap gesture, the user may be required to maintain finger pressure on the touchscreen 32 for a minimum amount of time. The digital television receiver 30 can be configured to recognize the press and hold gesture by comparing the duration of a touch in the vicinity of the promotion display to a threshold duration value, such that only those touch events lasting longer than the threshold value will be recognized as a press and hold gesture. In an alternative embodiment or implementation of the press and hold gesture, the digital television receiver 30 may measure a pressure applied to the touchscreen 32 and compare it against a threshold pressure value. Like the tap gesture, the press and hold gesture may be acknowledged with some form of haptic or audio feedback mechanism, such as a vibration or click. The time and/or pressure threshold values, as well as the haptic or audio feedback, may be configured as part of the overall look and feel of the digital television receiver 30 or it may be specific to the digital television receiver application.

Figure 5:
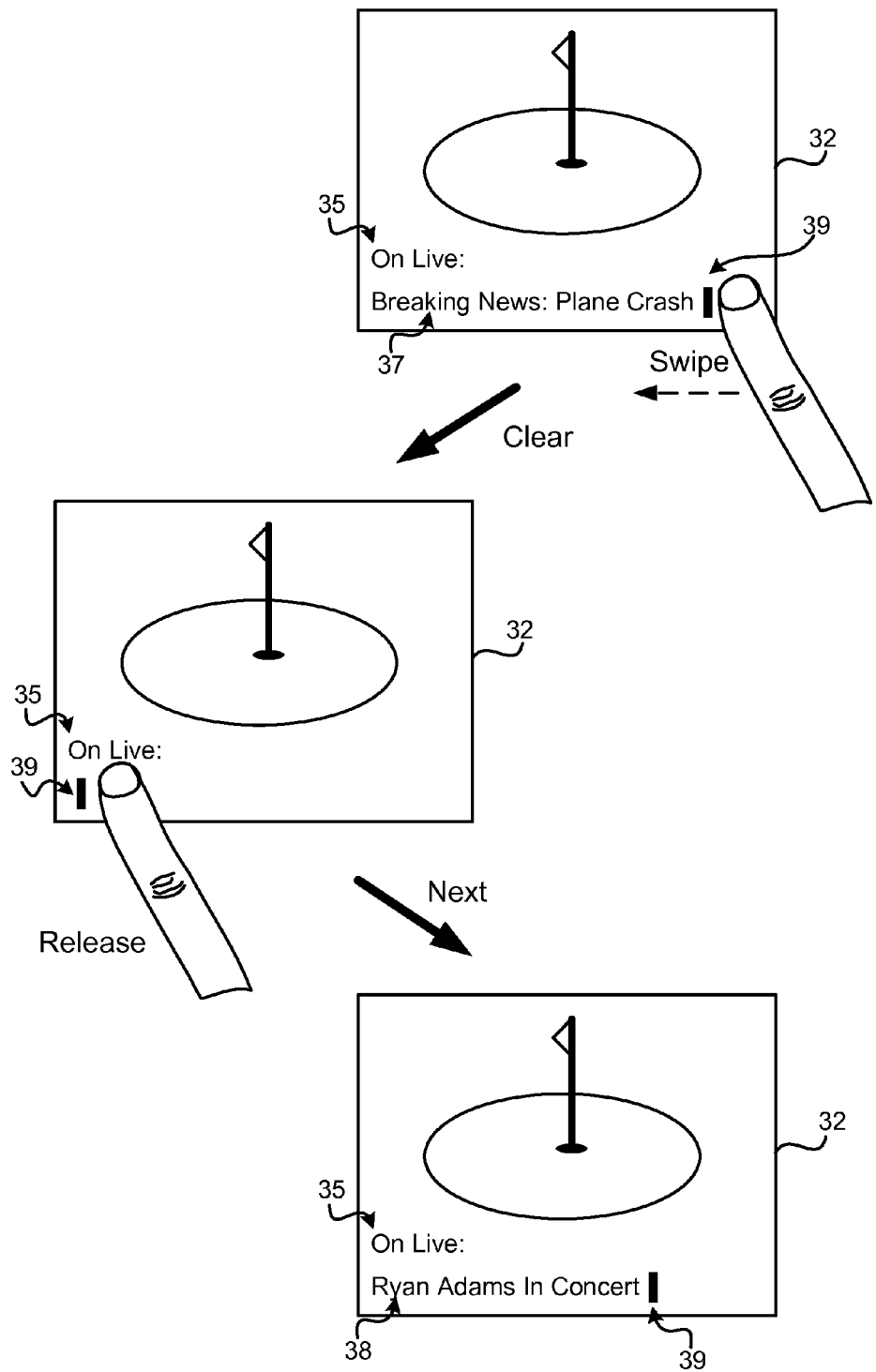

In an embodiment, the digital television receiver application may present a single notification line for presenting promotions for multiple channels of live content one at a time. An example of a multiple-event notification presented in a single line is illustrated in FIG. 5. While a selected content is displayed on the digital television receiver touchscreen display 32 the digital television receiver application may provide an on-screen notification 35 to inform the user of live content currently on another channel. The notification 35 may include a cursor 39 positioned in-line with the content promotion string 37. In this embodiment the user may view another promotion message by touching the touchscreen 32 with a finger and moving it so as to drag the cursor 39 across the content promotion string 37. For example, the user may touch a finger on or near the cursor 39 and move the finger towards the beginning of the content promotion string 37, which may be the left side of the touchscreen 32 (in other languages, the motion may be to the right side of the display). Such a movement is referred to herein as a "swipe" gesture. In an embodiment, the swipe gesture may be accomplished in a quick movement, consistent with a swiping motion. However, some embodiments may recognize the swipe gesture when the motion across the promotion string portion of the display is performed relatively slowly, consistent with what may more accurately be referred to as a hold and drag motion. For simplicity of description, both quick swiping motions and slower hold and drag motions are referred to herein as a swipe gesture. The digital television receiver application may be configured so that the cursor 39 moves with the finger as it slides across the touchscreen 32, clearing each character as the cursor moves across it. Thus, when a user performs the swipe gesture in a slow manner, such as a hold and drag motion, the display may animate the clearing of the content promotion string 37. Further, if the user reverse the direction of the swipe or drag motion, the digital television receiver application may re-display characters as the cursor 39 moves over them, enabling a user to re-establish a content promotion string 37 by reversing the swipe before the end is reached. The user may release the finger from the touchscreen 32 once the cursor 39 has erased each of the characters in the content promotion string 37. In response, the digital television receiver application may cause the cursor 39 to move back towards the right end of the screen displaying a second content promotion string 38 corresponding to a second channel or flow of live content.

In an embodiment the cursor movement may be animated in a manner that simulates a spring mechanism. In an embodiment the swipe gesture may be pressure-sensitive, in which the digital television receiver application tests whether the user presses a finger down with a force greater than a minimum threshold pressure value and/or less than a maximum threshold pressure value. In another embodiment the swipe gesture may acknowledged with some sort of haptic or audio feedback mechanism, such as a vibration or click. In another embodiment the distance that the finger moves may be tested against a predetermined minimum threshold value and/or against a predetermined maximum value. In another embodiment the swipe gesture may be tested against a velocity threshold value. For example, a touch event may be recognized as a swipe gesture if it comprises more than 30 pixels of movement in the horizontal direction within a 500 millisecond timeframe, but not more than 20 pixels in the vertical direction during that same movement. The length, time and/or pressure threshold values, as well as a haptic or audio feedback may be part of the overall look and feel configuration of the digital television receiver 30, or it may be specific to the digital television receiver application.

Figure 6:
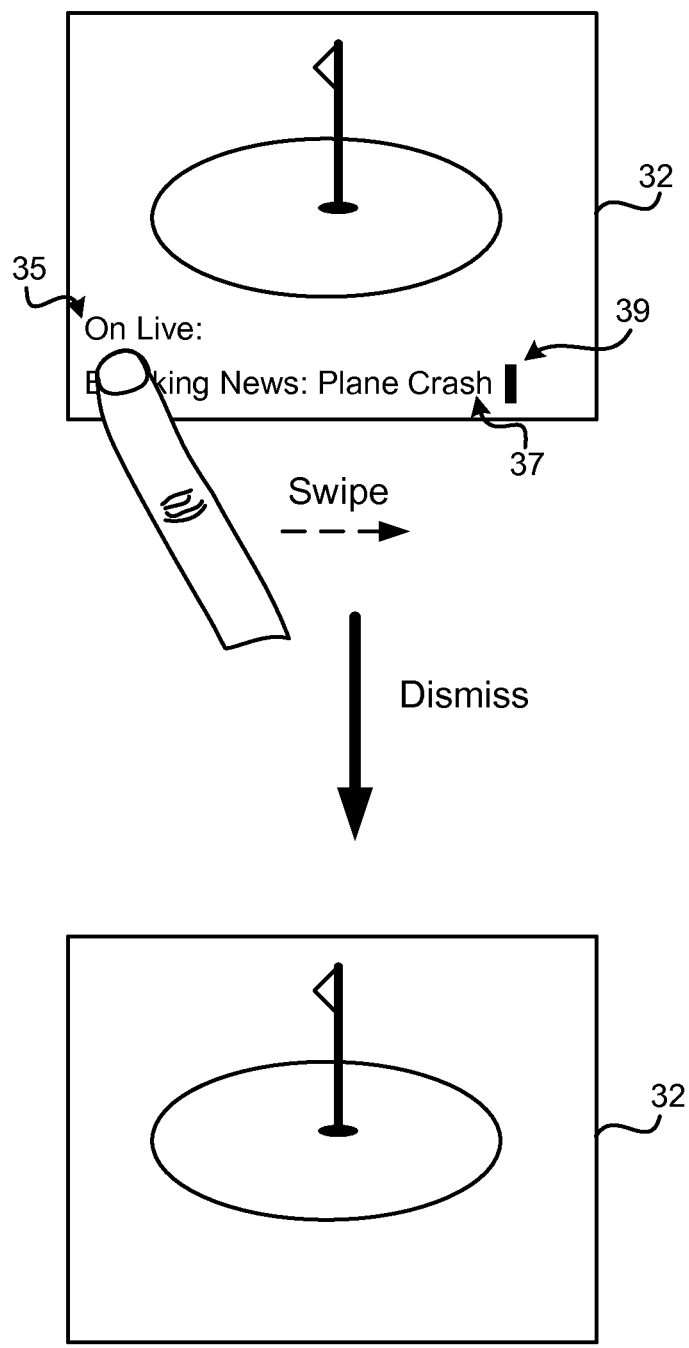

Some embodiments may allow users to dismiss an onscreen notification using a touch gesture. An example of a touch gesture to dismiss a prompt is illustrated in FIG. 6. In this embodiment, when the digital television receiver application displays an on-screen notification 35, the user may place a finger on the left side of the content promotion string 37 and move the finger toward the cursor 39 in a left to right swipe gesture. The digital television receiver application may be configured to recognize the left to right swipe as a request to dismiss the notification and remove the on-screen notification 35 from the display or touchscreen 32 for a predetermined time, such as 30 minutes, which may be user configurable. As with other touch gestures described above, the left to right swipe gesture may be pressure-sensitive by the application testing the touch event force against a minimum threshold and/or maximum threshold. As with other touch gestures described above, the left to right swipe gesture may be acknowledged with some sort of haptic or audio feedback mechanism, such as a vibration or click. As with other touch gestures described above, the left to right swipe gesture may be recognized based upon the length that the touch event moves compared to a predetermined minimum threshold value and/or a predetermined maximum threshold value. As with other touch gestures described above, the left to right swipe gesture may be recognized based upon whether the touch event satisfies a velocity threshold value as well. For example, a touch event may be recognized as a left to right swipe gesture if it comprises more than 30 pixels of movement in the horizontal direction within a 500 millisecond timeframe but not more than 20 pixels in the vertical direction during that same movement. As with other gestures, the length, time and/or pressure threshold values, as well as the haptic or audio feedback may be part of the overall look and feel configuration of the digital television receiver 30 or it may be specific to the digital television receiver application.

Figure 7:
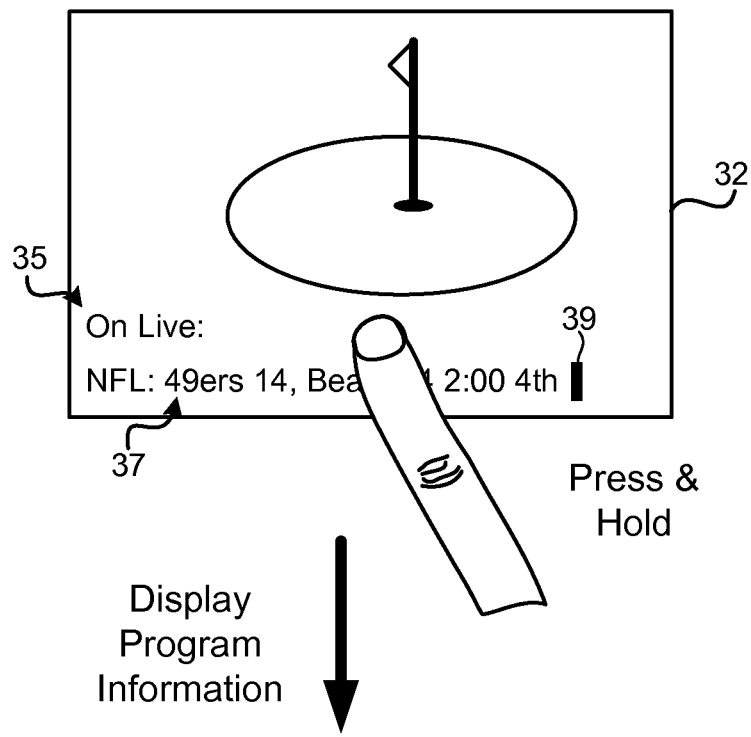
Figure 7:
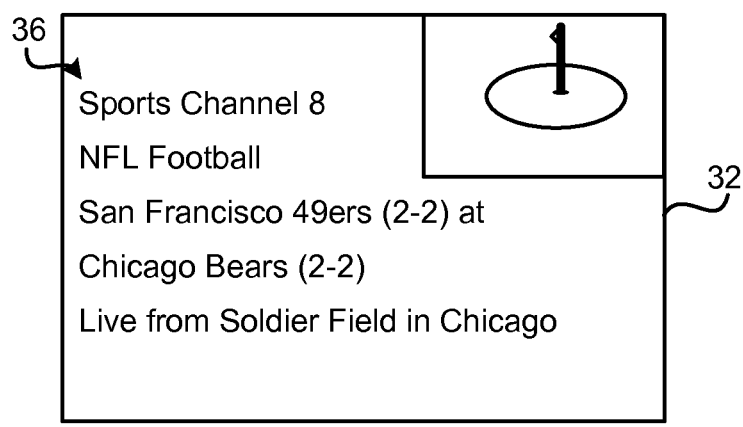

In a further embodiment, a digital television receiver application may also be configured to provide a user option to show a more detailed content promotion, such as in response to a press and hold gesture. An example of the press and hold touch gesture to display a detailed promotion is illustrated in FIG. 7. In this embodiment, when the digital television receiver application provides an on-screen notification 35 the user may press the touchscreen 32 on or near the content promotion string 37, and hold a finger down for a length of time exceeding a predetermined threshold value to indicate a desire to receive more information related to the promotion.

In response to the press and hold gesture, the digital television receiver application may be configured to display extended promotional information 36 on the touchscreen 32. The extended promotional information 36 may be received as part of the promotion message transmitted in the overhead flow, or may be taken from the electronic service guide information stored in memory of digital television receiver 30. For example, if the content being promoted is breaking news, the extended promotional information 36 may be a summary of the news event that is received as part of the promotion message received in the overhead flow. The extended promotional information 36 may be overlaid over the current content display. In an embodiment, the overlay may involve alpha blending so that the background content display is not completely obscured. Alternatively, the extended promotional information 36 and the current content may occupy mutually exclusive portions of the touchscreen 32. In an embodiment, the current content may be shown at a reduced resolution in corner of the touchscreen 32. Alternatively, the current content may be reduced in resolution in the horizontal or vertical direction, but not both, and appear distorted, while the extended promotional information 36 occupies the other portion of the screen. In an embodiment, a portion of the current content may be cropped off to make room for the extended promotional information 36.

Figure 8:
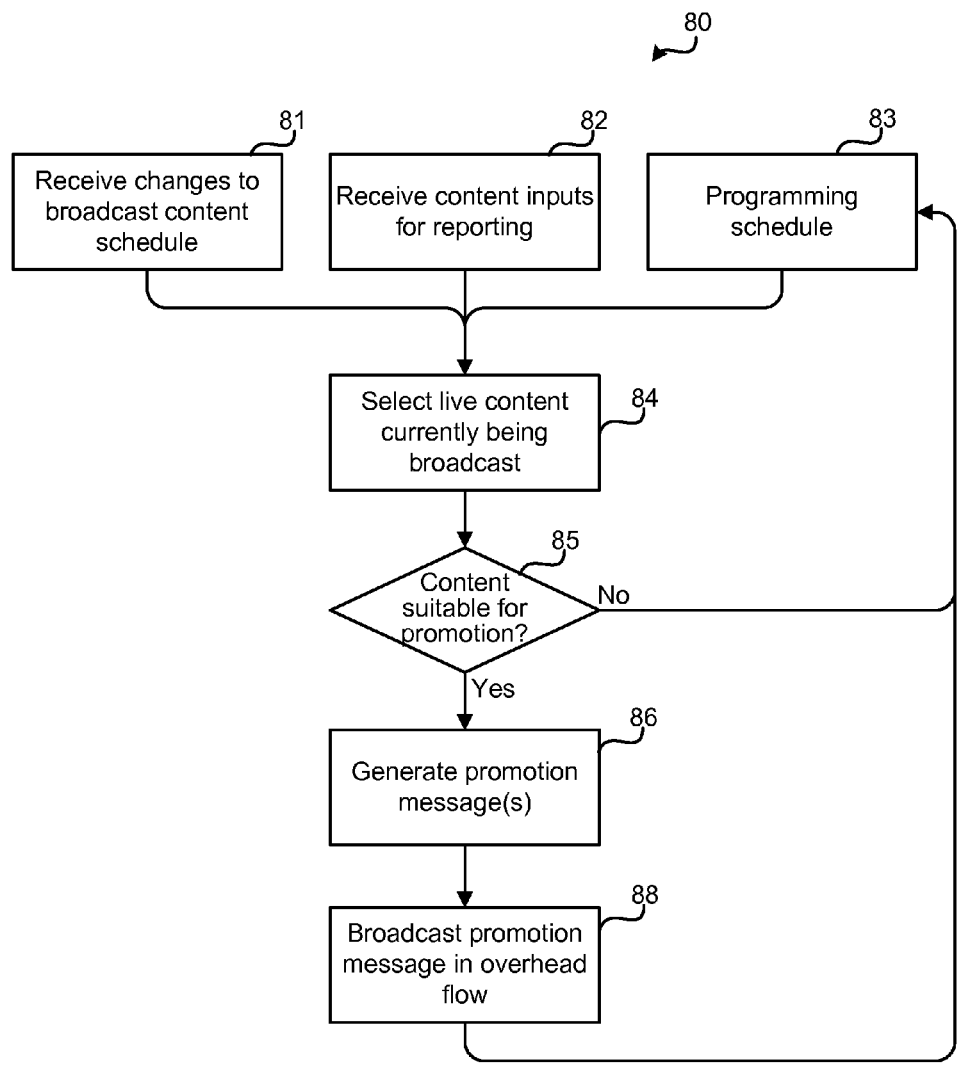
FIG. 8 is a process flow diagram of a method for implementing the various embodiments in a server within a digital broadcast television network.

The various embodiments may be embodied implemented in a digital broadcast television system to provide live content promotion messages as part of the overhead flow. FIG. 8 illustrates an example method 80 that may be implemented in a server within a digital broadcast television system to include such promotion messages within the overhead flow. A server within a digital broadcast television system network may be configured to provide content promotion messages in response to a variety of conditions. For example, a server may be configured to receive notifications from content providers of changes to the broadcast content schedule, step 81. Such changes in content may reflect special public announcements, news updates, live news coverage of breaking events, changes in program schedules due to unanticipated changes in program durations, such as sports events running into overtime, and similar unplanned programming events. At step 82, the server may also be configured to receive inputs from content providers indicating important events within a regularly scheduled broadcast program that viewers might be interested in learning about, such as a sports program going into overtime, an athlete about to break an important sports record, a widely publicized event within a popular broadcast program, or other information within a program that users might be interested in learning about. At step 83, the server may also access the program schedule to determine the programs that are currently being broadcast. At step 84, the server may compare the received program updates or program schedule to the current time to determine those that are current live broadcasts. Received program updates and program schedules that are currently being broadcast may then be tested by the server at determination step 85 to determine whether any are suitable for being reported to digital television receivers in a content promotion message.

If none of the currently broadcast programs are suitable for a content promotion notification message (i.e., determination step 85="No"), the server may wait for the next content input or program schedule change. If one or more of the currently broadcast programs is suitable for a content promotion notification message (i.e., determination step 85="Yes"), the server may generate a promotion message at step 86. In generating a content promotion message, the server may include information to be displayed in the promotion, such as the name of the program or a summary of the notification, as well as information that the digital television receiver can use in generating an actionable promotion announcement, including information to enable the digital television receiver to begin receiving the content associated with promotion in response to a user selection. For example, the promotion message may include the channel or flow number containing the program. For promotion messages broadcast in advance of the program, the promotion message may also include the broadcast time to enable digital television receiver to access the selected program at the appropriate time. In some implementations, the program message may include information regarding the frequency, content flow, or channel on which the content is being broadcast. At step 88, the server may then provide the formatted promotion message to the broadcaster so that it can be included within the overhead flow portion of the broadcast signal.

In various embodiments the promotion message included in the overhead flow may include a data portion containing information that the digital television receiver can use to select a content channel or flow, and a payload portion containing a promotional string of alphanumeric characters (i.e., "Breaking News: Plane Crash"). The promotion message may further include a channel or flow number which corresponds to the channel on which the live content is being broadcast in the data portion as well as in the payload portion. The promotion message data portion may also include a notification date and time, such as the day/time at which the notification is to be presented on the digital television receiver or the day/time that the content will be broadcast. In an embodiment, a blank or null-valued date/time value in the data portion may signify a promotion message that should be immediately presented. Further, the promotion message may include an extended promotional information string within the payload portion, which may be a series of alphanumeric characters. In an embodiment, the digital broadcast television system may broadcast multiple program messages within a short period of time in a queue of promotional messages. In another embodiment, digital broadcast television system may broadcast multiple program messages within a single superblock containing multiple promotional messages.

Figure 9A:
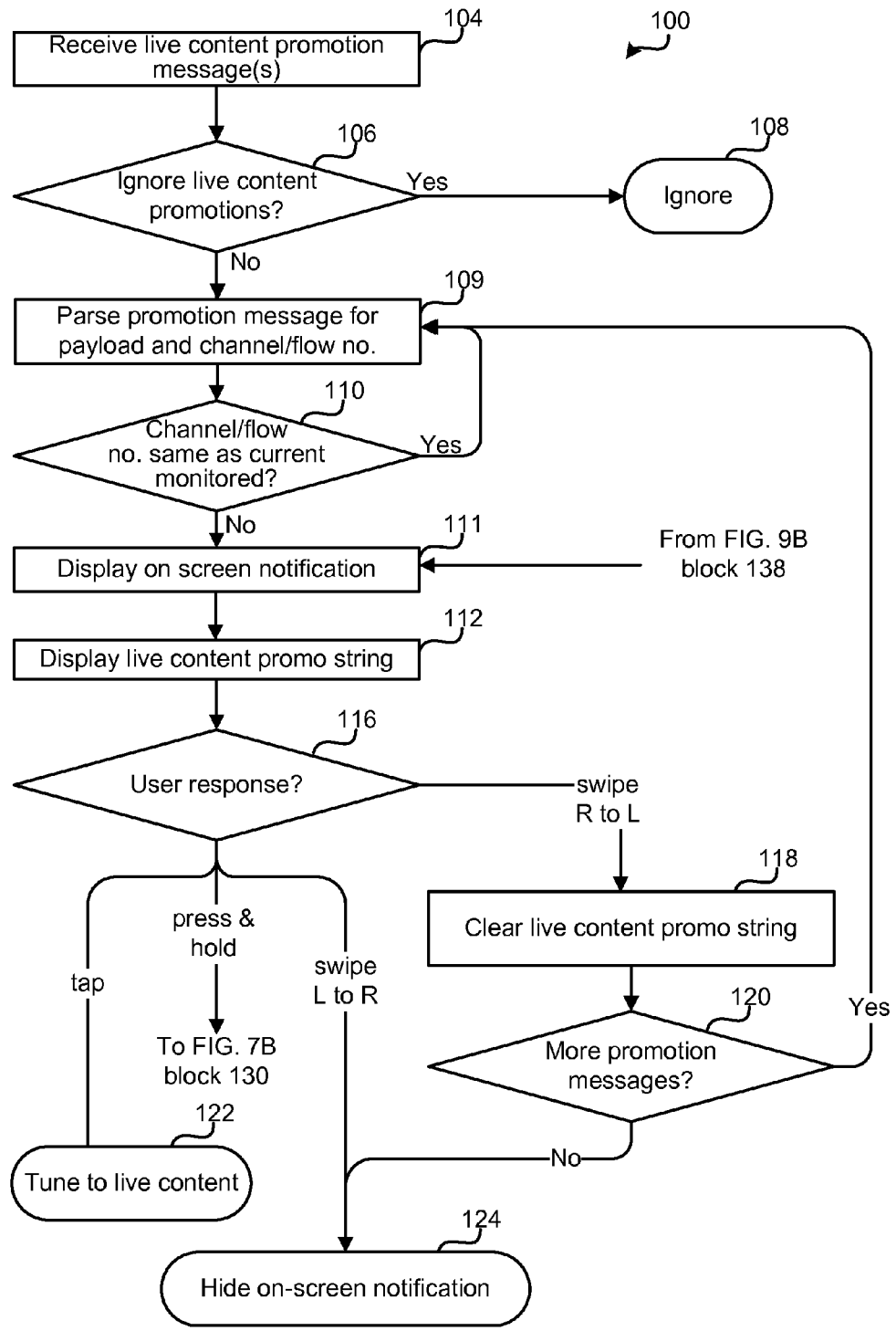
FIGS. 9A and 9B are a process flow diagram of a method implemented in a digital broadcast television application executing on a digital television receiver device.
Figure 9B:
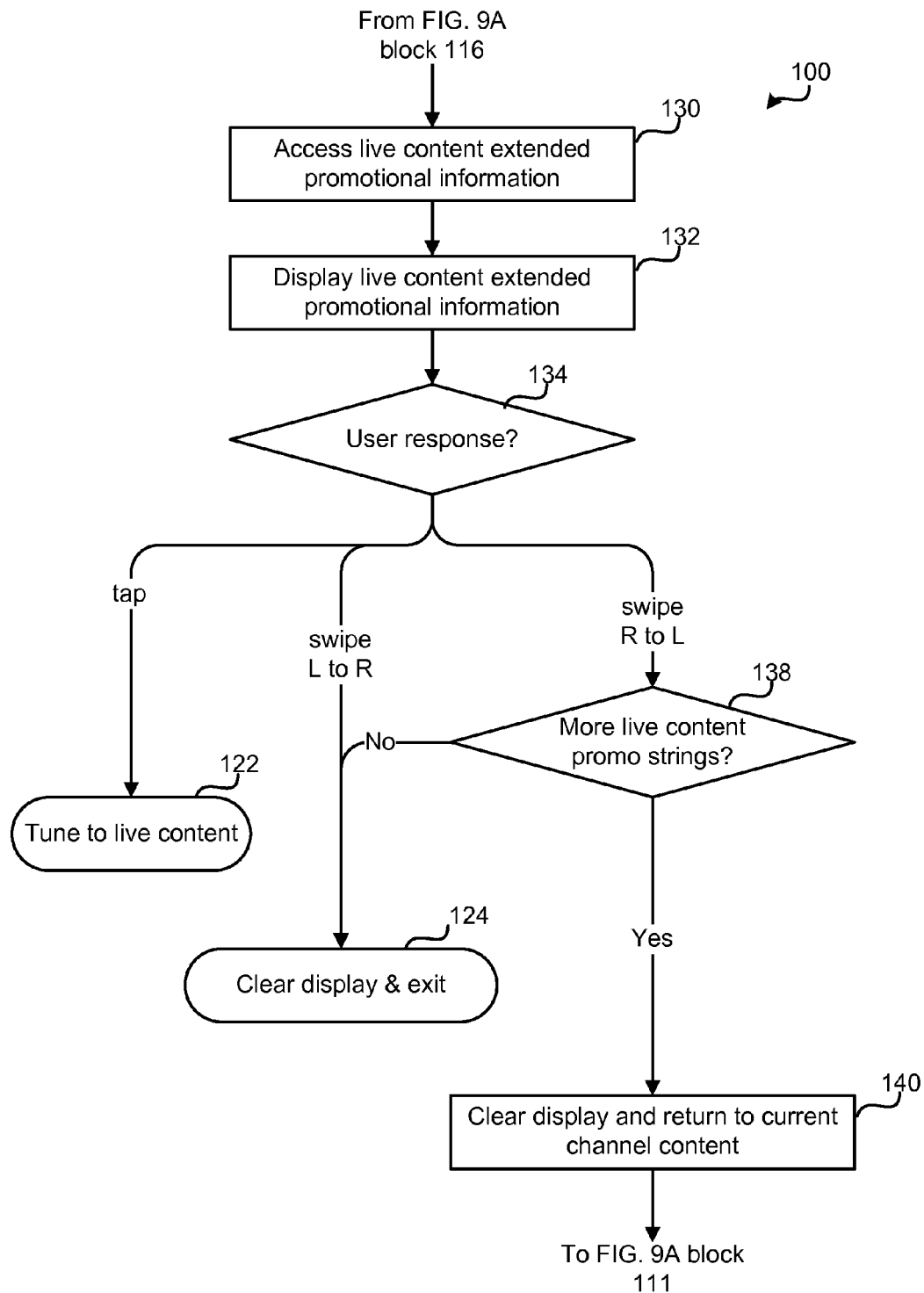

The various gestures illustrated in FIGS. 4-7 may all be implemented in a single digital television receiver application. An example method for presenting an on-screen notification of live content and responding to various touch gestures is shown in FIGS. 9A and 9B. In an embodiment method 100 illustrated in FIG. 9A, the digital television receiver application may receive a live content promotion message at step 104. As discussed above, the promotion message may be broadcast as part of the overhead flow within the broadcast signal. In an embodiment in which promotional messages are broadcasted in advance of when they should be displayed, a promotion message with a specified time/date value may be stored in a memory of the digital television receiver and moved to the notification queue at the specified display or broadcast time. In response to receiving a promotional message, the digital television receiver application may determine whether to ignore live content promotion messages at determination step 106. In an embodiment, the application may be configured to enable a user to set preferences to ignore promotions corresponding to content on one or more channels. In another embodiment, the application may be configured to enable a user to choose to ignore promotions while viewing certain types of content, such as movies. In some embodiments, the application may be configured to respond to a user input dismissing a notification (e.g., in the manner described in reference to FIG. 6) by ignoring promotion message notifications for a period of time. If promotion messages are being ignored (i.e., determination step 106="Yes"), the digital television receiver application may cease further processing of the promotion message (i.e., ignore the message) at step 108. In an embodiment, the promotion message queue may also be cleared at step 108.

If promotion messages are not being ignored (i.e., determination step 106="No"), the digital television receiver application may select a particular promotion message (if multiple promotion messages are received) and parse the selected message to obtain the data portion (including the channel or flow number) and the message payload portion at step 109. At determination step 110, the digital television receiver application may determine whether the received promotion message relates to a program not currently being displayed, such as by comparing the channel or flow number in the data portion of the parsed promotion message to the channel or flow number currently being received to determine whether the message relates to a different program. If promotion message relates to the program currently being viewed the channel or flow number in the promotion message will match the channel or flow number being received (i.e., determination step 110="Yes"), there is no need to display the promotion, so the digital television receiver application may return to step 109 to select and parse the next promotion message.

If the promotion message relates to a program different from that currently being viewed, the channel or flow number in the promotion message will not match the channel or flow number being received (i.e., determination step 110="No"), the digital television receiver application may display an on-screen notification including at least a portion of the characters in the payload portion of the message at step 111. As mentioned above, the promotion message display may be configured in a variety of ways, including presenting a header (e.g., a text string comprising the words "On Live") and a cursor. The digital television receiver application may further be configured to display the live content promotion string portion of the promotion message at step 112. In an embodiment, the digital television receiver application may display the promotion string simultaneously with the header and cursor (i.e., step 112 may be part of step 111). In an embodiment providing an animated cursor, the promotion string may be displayed one character at a time while the cursor moves across the screen. Such movement may be from the left side of the screen to the right side of the screen in an embodiment supporting the English language.

Upon displaying a promotional string, the digital television receiver application may wait for a user response at determination step 116. The digital television receiver application may be configured to recognize and respond to a variety of touch gestures, such as the tap, press and hold, and swipe gestures described above. If the digital television receiver detects a tap gesture as described above with reference to FIG. 4 (i.e., determination step 116="tap"), the digital television receiver application may be configured to access the content flow in the channel or flow number identified in the received promotion message at step 122. If the digital television receiver detects a left to right swipe gesture as described above with reference to FIG. 6 (i.e., determination step 116="swipe L to R"), the user may clear the content promotion message text from the screen at step 124. If the digital television receiver detects right to left swipe gesture as described above with reference to FIG. 5 (i.e., determination step 116="swipe R to L"), the digital television receiver application may clear the content promotion string portion of the on-screen notification at step 118.

Clearing the promotion string at step 118 may include moving the cursor to match the user's finger movement on the touchscreen (i.e., the user may drag the cursor) and may also include clearing each pixel of the live content promotion string as the cursor passes over it. Clearing the promotion string at step 118 may clear the content promotion string from memory (e.g., from a queue of content promotion strings) as well as clearing the display. In an embodiment that supports multiple simultaneous promotion messages, the digital television receiver application may determine if there are additional promotion messages to display at determination step 120. If not (i.e., determination step 120="No"), the digital television receiver application may clear the on-screen notification at step 124. If there are additional promotion messages (i.e., test 120="Yes"), the digital television receiver application may return to step 109 to select and parse the next promotion message.

The method 100 continued in FIG. 9B may also enable displaying extended promotional information relating to a displayed promotional message. If the digital television receiver 30 detects a press and hold gesture in response to an on-screen notification as described above with reference to FIG. 7 (i.e., test 116="press and hold"), at step 130 the digital television receiver application may access extended promotional information related to the live content that is stored in memory. As previously discussed, the extended promotional information may be provided in the received promotion message or retrieved from information in the electronic viewing guide 31. The digital television receiver application may display the extended promotional information at step 132. Displaying the extended promotional information may include clearing the on-screen notification and the promotional string. Further, displaying the extended promotional information may involve overlaying or resizing the current content as previously discussed with reference to FIG. 7.

The digital television receiver application may interpret a user response to the display of the extended promotional information, at determination step 134. If the digital television receiver determines that the user executed a swipe from left to right (i.e., determination step 134="swipe L to R"), the application may clear the display and return to the previously viewed content at step 124. If the digital television receiver determines that the user executed a tap gesture (i.e., determination step 134="tap"), the application may access the content associated with the content promotion message at step 122. If the digital television receiver determines that the user executed a right to left swipe gesture (i.e., test 134="swipe R to L"), the digital television receiver application may determine if there are any additional content promotion messages to be displayed at determination step 138. If not (i.e., determination step 138="No"), the digital television receiver application may clear the display and exit to return to the previously viewed content at step 124. If there is an additional content promotion message to be displayed (i.e., determination step 138="Yes"), the digital television receiver application may clear the extended promotional information and return to the current channel content at step 140, return to step 109 in FIG. 9A to select and parse the next promotion message.

Figure 10:
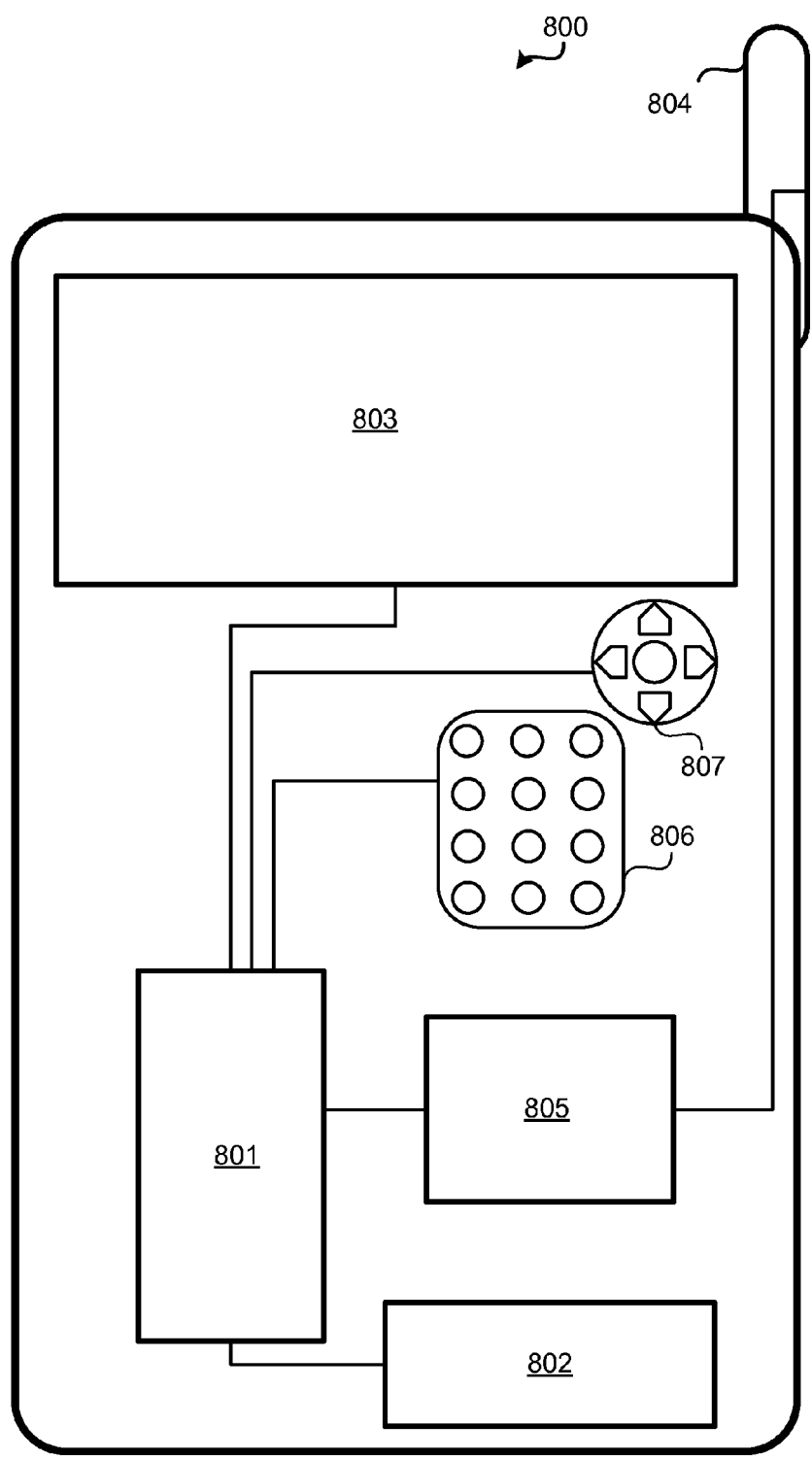
FIG. 10 is a component block diagram of an exemplary digital television receiver suitable for use with the embodiments.

Typical digital television receivers suitable for use with the various embodiments will have in common the components illustrated in FIG. 10. For example, an exemplary digital television receiver device 800 may include a processor 801 coupled to internal memory 802, and to a display 803. In a preferred embodiment, the display 803 comprises a touchscreen display configured to receive user input gestures. Additionally, the digital television receiver device 800 may have an antenna 804 for sending and receiving electromagnetic radiation that is connected to a digital television receiver circuit 805 that is coupled to the processor 801. An example of a digital television receiver circuit is the UBM2 circuit manufactured by Qualcomm, Inc. Digital television receiver devices that do not include a touchscreen display may also include a key pad 806 or miniature keyboard and menu selection buttons or rocker switches 807 for receiving user inputs. Digital television receiver devices 800 may be configured in a variety of forms, including conventional digital television sets, computers configured to receive digital television, and mobile devices configured to receive mobile broadcast television services.

The processor 801 may be any programmable microprocessor, microcomputer or multiple processor chip or chips that can be configured by software instructions (applications) to perform a variety of functions, including the functions of a digital television receiver application and the various embodiments described herein. In some digital television receiver devices, multiple processors 801 may be provided, such as one processor dedicated to signal processing functions and one processor dedicated to running other applications. Typically, software applications (e.g., a digital television receiver application) may be stored in the internal memory 802 before they are accessed and loaded into the processor 801. In some digital television receiver devices, the processor 801 may include internal memory sufficient to store the application software instructions. In many digital television receiver devices, the internal memory 802 may be a volatile or nonvolatile memory, such as flash memory, or a mixture of both. For the purposes of this description, a general reference to memory refers to all memory accessible by the processor 801, including internal memory 802, removable memory plugged into the digital television receiver device, and memory within the processor 801 itself, including the secure memory 808.

Figure 11:
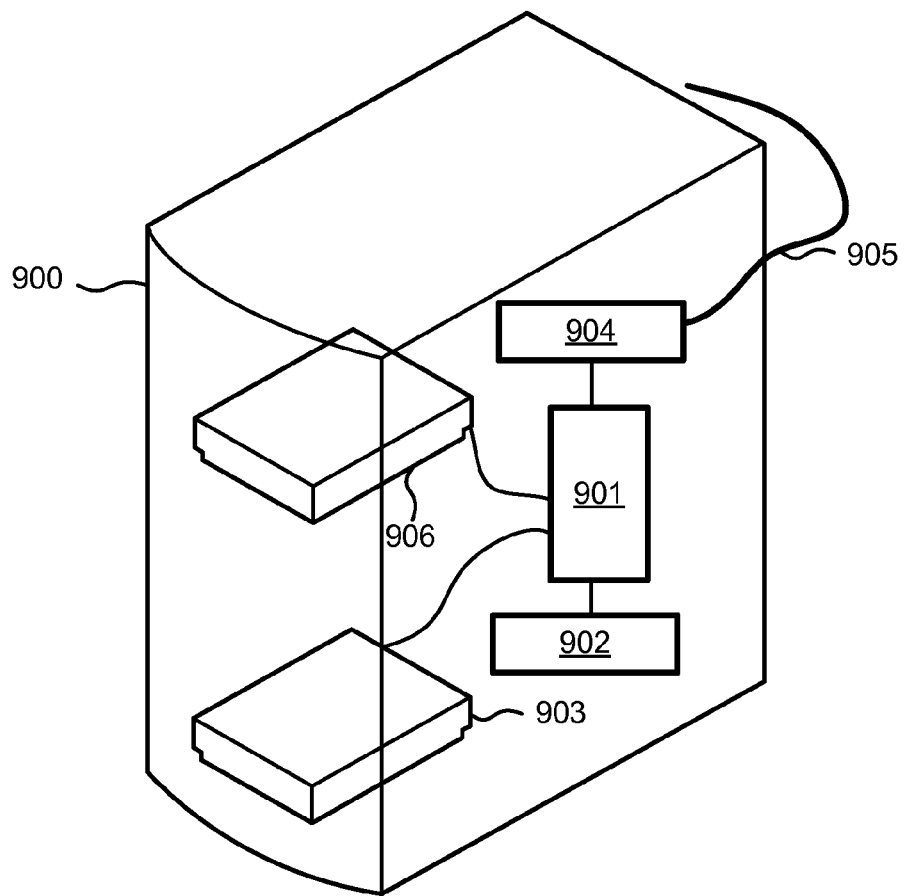
FIG. 11 is a component block diagram of an exemplary server suitable for use with the embodiments.

A number of the embodiments described above may also be implemented with any of a variety of commercially available remote server devices, such as the server 900 illustrated in FIG. 11. Such a server 900 typically includes a processor 901 coupled to volatile memory 902 and a large capacity nonvolatile memory, such as a disk drive 903. The server 900 may also include a floppy disc drive and/or a compact disc (CD) drive 906 coupled to the processor 901. The server 900 may also include network access ports 904 coupled to the processor 901 for establishing data connections with a network 905, such as the Internet.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for providing a live content promotion on a digital television receiver, comprising:

receiving, in the digital television receiver, a promotion message indicating an occurrence of an event within a program currently being broadcast, the promotion message being included within an overhead flow of a digital broadcast signal being broadcast from a digital broadcast television system, the promotion message comprising a data portion and a payload portion, the overhead flow being received at a different data rate from content included within the digital broadcast signal;

parsing the received promotion message to obtain the data portion and the payload portion;

determining whether the received promotion message relates to a program that is different from a currently displayed program; and displaying at least part of the payload portion in a first promotion string on a display of the digital television receiver when the received promotion message relates to a program that is different from the currently displayed program.

2. The method of claim 1, further comprising:

receiving a user input on the digital television receiver;

determining whether the user input corresponds to selecting a program corresponding to the received promotion message; and accessing the program corresponding to the received message using the data portion of the promotion message when the user input corresponds to selecting a program corresponding to the received message.

3. The method of claim 2, wherein determining whether the user input corresponds to selecting a program comprises determining whether the user input comprises a tap input.

4. The method of claim 1, further comprising:

receiving a user input on the digital television receiver;

determining whether the user input corresponds to requesting another promotion message; and displaying a second promotion string from another promotion message on the display of the digital television receiver when the user input corresponds to requesting another promotion message.

5. The method of claim 4, wherein:
the digital television receiver display comprises a touchscreen; and
determining whether the user input corresponds to requesting another promotion message comprises determining whether the user input comprises a right to left swipe input on the touchscreen.

6. The method of claim 5, further comprising removing each character of the first promotion string as a finger moves across each character displayed on the touchscreen.

7. The method of claim 1, further comprising:
receiving a user input on the digital television receiver;
determining whether the user input corresponds to requesting that promotion messages not be displayed; and
suspending display of promotion strings on the display of the digital television receiver when the user input corresponds to requesting that promotion messages not be displayed.

8. The method of claim 7, wherein determining whether the user input corresponds to requesting that promotion messages not be displayed comprises determining whether the user input comprises a left to right swipe input on the touchscreen.

9. The method of claim 1, wherein:
the digital broadcast television system is a mobile broadcast television network; and
the digital television receiver is a mobile broadcast television receiver device.

10. The method of claim 9, wherein:
the mobile broadcast television network is a wireless broadcast network; and
the mobile broadcast television receiver device is a wireless receiver device.

11. A digital television receiver device, comprising:
a processor;
a digital television receiver circuit coupled to the processor; and
a display coupled to the processor,
wherein the processor is configured with processor-executable instructions to perform operations comprising:
receiving a digital broadcast television signal including a promotion message indicating an occurrence of an event within a program currently being broadcast, the promotion message having a data portion and a payload portion, the promotion message being received at a different data rate from content included within the digital broadcast television signal;
receiving the promotion message within the digital television receiver;
parsing the received promotion message to obtain the data portion and the payload portion;
determining whether the received message relates to a program that is different from a currently displayed program; and
displaying at least part of the payload portion in a first promotion string on the display when the received message relates to a program that is different from the currently displayed program.

12. The digital television receiver device of claim 11, wherein the processor is configured with processor-executable instructions to perform operations further comprising:
receiving a user input on the digital television receiver;
determining whether the user input corresponds to selecting a program corresponding to the received promotion message; and
accessing the program corresponding to the received message using the data portion of the promotion message when the user input corresponds to selecting a program corresponding to the received message.

13. The digital television receiver device of claim 12, wherein:
the display comprises a touchscreen display; and
the processor is configured with processor-executable instructions such that determining whether the user input corresponds to selecting a program comprises determining whether the user input comprises a tap input on the touchscreen display.

14. The digital television receiver device of claim 11, wherein the processor is configured with processor-executable instructions to perform operations further comprising:
receiving a user input on the digital television receiver;
determining whether the user input corresponds to requesting another promotion message; and
displaying a second promotion string from another promotion message on the display of the digital television receiver when the user input corresponds to requesting another promotion message.

15. The digital television receiver device of claim 14, wherein:
the display comprises a touchscreen display; and
the processor is configured with processor-executable instructions such that determining whether the user input corresponds to requesting another promotion message comprises determining whether the user input comprises a right to left swipe input on the touchscreen display.

16. The digital television receiver device of claim 15, wherein the processor is configured with processor-executable instructions to perform operations further comprising removing each character of the first promotion string as a finger moves across each character displayed on the touchscreen display.

17. The digital television receiver device of claim 11, wherein the processor is configured with processor-executable instructions to perform operations further comprising:
receiving a user input on the digital television receiver;
determining whether the user input corresponds to requesting that promotion messages not be displayed; and
suspending display of promotion strings on the display when the user input corresponds to requesting that promotion messages not be displayed.

18. The digital television receiver device of claim 17, wherein:
the display comprises a touchscreen display; and
the processor is configured with processor-executable instructions such that determining whether the user input corresponds to requesting that promotion messages not be displayed comprises determining whether the user input comprises a left to right swipe input on the touchscreen display.

19. The digital television receiver device of claim 11, wherein the digital television receiver device is configured as a mobile device.

20. The digital television receiver device of claim 19, wherein the mobile device is a wireless mobile broadcast television receiver device.

21. A digital television receiver device, comprising:
means for receiving a digital broadcast signal from a digital broadcast television system including a promotion message within an overhead flow, the promotion message comprising a data portion and a payload portion, the promotion message indicating an occurrence of an event within a program currently being broadcast, the overhead flow being received at a different data rate from content included within the digital broadcast signal;

means for receiving the promotion message;

means for parsing the received promotion message to obtain the data portion and the payload portion;

means for determining whether the received message relates to a program that is different from a currently displayed program; and means for displaying at least part of the payload portion in a first promotion string when the received message relates to a program that is different from the currently displayed program.

22. The digital television receiver device of claim 21, further comprising:

means for receiving a user input;

means for determining whether the user input corresponds to selecting a program corresponding to the received promotion message; and means for accessing the program corresponding to the received message using the data portion of the promotion message when the user input corresponds to selecting a program corresponding to the received message.

23. The digital television receiver device of claim 22, wherein means for determining whether the user input corresponds to selecting a program comprises means for determining whether the user input comprises a tap input.

24. The digital television receiver device of claim 21, further comprising:

means for receiving a user input on the digital television receiver;

means for determining whether the user input corresponds to requesting another promotion message; and means for displaying a second promotion string from another promotion message when the user input corresponds to requesting another promotion message.

25. The digital television receiver device of claim 24, wherein:

means for displaying comprises a touchscreen display; and means for determining whether the user input corresponds to requesting another promotion message comprises means for determining whether the user input comprises a right to left swipe input on the touchscreen.

26. The digital television receiver device of claim 25, further comprising means for removing each character of the first promotion string as a finger moves across each character displayed on the touchscreen display.

27. The digital television receiver device of claim 21, further comprising:

means for receiving a user input on the digital television receiver;

means for determining whether the user input corresponds to requesting that promotion messages not be displayed; and means for suspending display of promotion strings when the user input corresponds to requesting that promotion messages not be displayed.

28. The digital television receiver device of claim 27, wherein:

means for displaying comprises a touchscreen display; and means for determining whether the user input corresponds to requesting that promotion messages not be displayed comprises means for determining whether the user input comprises a left to right swipe input on the touchscreen display.

29. The digital television receiver device of claim 21, wherein:

the digital broadcast television system is a mobile broadcast television network; and the digital television receiver device is configured as a mobile broadcast television receiver device.

30. The digital television receiver device of claim 29, wherein:

the mobile broadcast television network is a wireless broadcast network; and the mobile broadcast television receiver device is a wireless receiver device.

31. A non-transitory processor-readable storage medium having stored thereon processor-executable instructions configured to cause a processor to perform operations comprising:

receiving digital broadcast signal from a digital broadcast television system including a promotion message within an overhead flow, the promotion message comprising a data portion and a payload portion, the promotion message indicating an occurrence of an event within a program currently being broadcast, the overhead flow being received at a different data rate from content included within the digital broadcast signal;

receiving the promotion message;

parsing the received promotion message to obtain the data portion and the payload portion;

determining whether the received promotion message relates to a program that is different from a currently displayed program; and displaying at least part of the payload portion in a first promotion string on a display when the received message relates to a program that is different from the currently displayed program.

32. The non-transitory processor-readable storage medium of claim 31, wherein the storage medium has stored thereon processor-executable instructions configured to cause a processor to perform operations further comprising:

receiving a user input;

determining whether the user input corresponds to selecting a program corresponding to the received promotion message; and accessing the program corresponding to the received message using the data portion of the promotion message when the user input corresponds to selecting a program corresponding to the received message.

33. The non-transitory processor-readable storage medium of claim 32, wherein the stored processor-executable instructions are configured such that determining whether the user input corresponds to selecting a program comprises determining whether the user input comprises a tap input on a touchscreen display.

34. The non-transitory processor-readable storage medium of claim 31, wherein the storage medium has stored thereon processor-executable instructions configured to cause a processor to perform operations further comprising:

receiving a user input;

determining whether the user input corresponds to requesting another promotion message; and displaying a second promotion string from another promotion message when the user input corresponds to requesting another promotion message.

35. The non-transitory processor-readable storage medium of claim 34, wherein the stored processor-executable instructions are configured such that determining whether the user input corresponds to requesting another promotion message comprises determining whether the user input comprises a right to left swipe input on a touchscreen display.

36. The non-transitory processor-readable storage medium of claim 35, wherein the storage medium has stored thereon processor-executable instructions configured to cause a processor to perform operations further comprising removing each character of the first promotion string as a finger moves across each character displayed on the touchscreen.

37. The non-transitory processor-readable storage medium of claim 31, wherein the storage medium has stored thereon processor-executable instructions configured to cause a processor to perform operations further comprising:
receiving a user input;
determining whether the user input corresponds to requesting that promotion messages not be displayed; and
suspending display of promotion strings when the user input corresponds to requesting that promotion messages not be displayed.

38. The non-transitory processor-readable storage medium of claim 37, wherein the stored processor-executable instructions are configured such that determining whether the user input corresponds to requesting that promotion messages not be displayed comprises determining whether the user input comprises a left to right swipe input on a touchscreen display.

39. The non-transitory processor-readable storage medium of claim 31, wherein the stored processor-executable instructions are executable on a processor of a mobile broadcast television receiver device.

40. The non-transitory processor-readable storage medium of claim 39, wherein the stored processor-executable instructions are executable on a processor of a wireless receiver device.

41. A digital broadcast television system, comprising:
a server configured to communicate with other servers via a network; and
a broadcast transmitter coupled to the server and configured to broadcast digital television signals comprising a content flow and an overhead flow, the overhead flow being broadcast at a different data rate than the content flow,
wherein the server is configured with server-executable instructions to perform operations comprising:
receiving information indicating an occurrence of an event within a program currently being broadcast; and
generating a promotion message to indicate the occurrence of the event within the program currently being broadcast, the generated promotion message comprising a data portion and a payload portion, wherein:
the data portion identifies a portion of the broadcast digital television signals carrying the program currently being broadcast; and
the payload portion includes a text string describing the program currently being broadcast; and
providing the generated promotion message to the broadcast transmitter,
wherein the broadcast transmitter is configured to broadcast the generated promotion message within the overhead flow.

42. A digital broadcast television system, comprising:
means for receiving information indicating an occurrence of an event within a program currently being broadcast;
means for generating a promotion message to indicate the occurrence of the event within the program currently being broadcast, the generated promotion message comprising a data portion and a payload portion, wherein:
the data portion identifies a portion of the broadcast digital television signals carrying the program currently being broadcast; and
the payload portion includes a text string describing the program currently being broadcast;
means for providing the generated promotion message to the broadcast transmitter; and
means for broadcasting the generated promotion message within an overhead flow of a digital television broadcast signal, the overhead flow being broadcast at a different data rate from content included within the broadcast digital television signals.

43. A non-transitory server-readable storage medium having stored thereon server-executable instructions configured to cause a server to perform operations comprising:
receiving information indicating an occurrence of an event within a program currently being broadcast;
generating a promotion message to indicate the occurrence of the event within the program currently being broadcast, the generated promotion message comprising a data portion and a payload portion, wherein:
the data portion identifies a portion of the broadcast digital television signals carrying the program currently being broadcast; and
the payload portion includes a text string describing the program currently being broadcast; and
providing the generated promotion message to a broadcast transmitter in a form suitable for broadcast within an overhead flow of a digital television broadcast signal, the overhead flow being broadcast at a different data rate from content included within the broadcast digital television broadcast signal.

44. A method of providing a live content promotion on a digital television receiver, comprising:
receiving, in a wireless broadcast, a digital broadcast signal comprising a content flow and an overhead flow, the overhead flow carrying a promotion message having a data portion and a payload portion, the overhead flow being received at a different data rate from the content flow;
parsing the promotion message to obtain at least the payload portion;
determining whether the promotion message relates to a broadcast program that is different from a currently displayed program; and
displaying at least part of the payload portion in a first promotion string when the promotion message relates to a broadcast program different from the currently displayed program.

* * * * *